(12) United States Patent
Madsen

(10) Patent No.: US 11,469,441 B2
(45) Date of Patent: Oct. 11, 2022

(54) ENERGY STORAGE DEVICE

(71) Applicant: Dyson Technology Limited, Wiltshire (GB)

(72) Inventor: Alex Madsen, Swindon (GB)

(73) Assignee: Dyson Technology Limited, Malmesbury (GB)

(*) Notice: Subject to any disclaimer, the term of this patent is extended or adjusted under 35 U.S.C. 154(b) by 107 days.

(21) Appl. No.: 16/494,862

(22) PCT Filed: Mar. 16, 2018

(86) PCT No.: PCT/GB2018/050692
§ 371 (c)(1),
(2) Date: Sep. 17, 2019

(87) PCT Pub. No.: WO2018/167512
PCT Pub. Date: Sep. 20, 2018

(65) Prior Publication Data
US 2020/0091545 A1    Mar. 19, 2020

(30) Foreign Application Priority Data
Mar. 17, 2017 (GB) .................................... 1704294

(51) Int. Cl.
*H01M 50/531* (2021.01)
*H01M 50/30* (2021.01)
*H01M 10/04* (2006.01)

(52) U.S. Cl.
CPC ... *H01M 10/0459* (2013.01); *H01M 10/0422* (2013.01); *H01M 50/531* (2021.01)

(58) Field of Classification Search
CPC ..... H01M 50/531; H01M 10/04; H01M 10/06
See application file for complete search history.

(56) References Cited

U.S. PATENT DOCUMENTS

| 3,373,060 A | 3/1968 | Gray |
| 3,395,043 A | 7/1968 | Shoeld |

(Continued)

FOREIGN PATENT DOCUMENTS

| CN | 1588688 A | 3/2005 |
| CN | 103443988 A | 12/2013 |

(Continued)

OTHER PUBLICATIONS

International Search Report and Written Opinion dated May 29, 2018, directed to International Application No. PCT/GB2018/050692; 12 pages.

(Continued)

*Primary Examiner* — Kenneth J Douyette
(74) *Attorney, Agent, or Firm* — Faegre Drinker Biddle & Reath LLP

(57) ABSTRACT

An energy storage device comprising: a container, a mandrel, at least one sheet of separator material, and two or more electrodes. The container comprises an internal space defined by at least one internal wall and a base. The mandrel comprises a longitudinal axis, and is positioned in the container such that the longitudinal axis passes through the internal space and the base. The sheet of separator material is arranged about the mandrel to provide a plurality of discrete separator layers which are spaced apart in a packing direction normal to the longitudinal axis. At least one electrode is provided between each of the discrete separator layers, and the mandrel has at least one hollow column running along the length of its longitudinal axis such that a part of the base is accessible via the hollow column.

5 Claims, 4 Drawing Sheets

(56) References Cited

U.S. PATENT DOCUMENTS

| | | | |
|---|---|---|---|
| 3,897,266 A * | 7/1975 | Devitt | H01M 10/34 |
| | | | 429/57 |
| 4,158,300 A | 6/1979 | Hug et al. | |
| 4,212,179 A | 7/1980 | Juergens | |
| 5,323,527 A | 6/1994 | Ribordy et al. | |
| 5,521,021 A * | 5/1996 | Alexandres | H01M 10/0431 |
| | | | 429/54 |
| 6,287,719 B1 | 9/2001 | Bailey | |
| 6,485,859 B1 | 11/2002 | Szyszkowski | |
| 7,811,697 B2 | 10/2010 | Hyung et al. | |
| 8,129,048 B2 | 3/2012 | Hirakawa et al. | |
| 9,136,557 B2 | 9/2015 | Bouvier | |
| 9,742,045 B2 | 8/2017 | Chami et al. | |
| 2001/0036571 A1 | 11/2001 | Oogami et al. | |
| 2002/0160257 A1 | 10/2002 | Lee et al. | |
| 2003/0077506 A1 | 4/2003 | Michel et al. | |
| 2003/0091893 A1 | 5/2003 | Kishiyama et al. | |
| 2003/0162086 A1 | 8/2003 | Longhi, Jr. et al. | |
| 2006/0121339 A1 | 6/2006 | Woo et al. | |
| 2006/0222943 A1 | 10/2006 | Fujikawa et al. | |
| 2009/0061304 A1 | 3/2009 | Muraoka et al. | |
| 2009/0077794 A1 | 3/2009 | Hirakawa et al. | |
| 2009/0123833 A1 | 5/2009 | Mao et al. | |
| 2011/0104572 A1 | 5/2011 | Ahn et al. | |
| 2011/0217586 A1 | 9/2011 | Kim et al. | |
| 2011/0229747 A1 | 9/2011 | Mitani et al. | |
| 2012/0164494 A1 | 6/2012 | Schaefer et al. | |
| 2012/0328922 A1 | 12/2012 | Bonhomme et al. | |
| 2013/0004817 A1 | 1/2013 | Lee et al. | |
| 2013/0288115 A1 * | 10/2013 | Nidelkoff | H01M 10/0587 |
| | | | 429/208 |
| 2013/0344363 A1 | 12/2013 | Upadhyaya | |
| 2014/0011076 A1 | 1/2014 | Kanemoto et al. | |
| 2014/0038027 A1 | 2/2014 | Kanemoto et al. | |
| 2014/0045052 A1 | 2/2014 | Kim | |
| 2014/0082930 A1 | 3/2014 | Bouvier | |
| 2014/0099525 A1 | 4/2014 | Kwon et al. | |
| 2014/0349158 A1 | 11/2014 | Kanemoto et al. | |
| 2020/0020894 A1 | 1/2020 | Madsen | |
| 2020/0091546 A1 | 3/2020 | Madsen | |
| 2020/0099086 A1 | 3/2020 | Madsen | |

FOREIGN PATENT DOCUMENTS

| | | |
|---|---|---|
| CN | 103733384 A | 4/2014 |
| CN | 103765665 A | 4/2014 |
| CN | 103782438 A | 5/2014 |
| CN | 104137318 A | 11/2014 |
| DE | 102012018040 A1 | 3/2014 |
| EP | 0797849 B1 | 11/2003 |
| EP | 1768202 | 3/2007 |
| EP | 1348237 | 8/2011 |
| EP | 2693523 A2 | 2/2014 |
| EP | 2693553 A2 | 2/2014 |
| EP | 2696429 | 2/2014 |
| EP | 2757624 A1 | 7/2014 |
| JP | 08-083595 A | 3/1996 |
| JP | 11-086877 A | 3/1999 |
| JP | H11-73941 A | 3/1999 |
| JP | H11-204130 A | 7/1999 |
| JP | 2000-156241 A | 6/2000 |
| JP | 2002-246278 A | 8/2002 |
| JP | 2003-529944 A | 10/2003 |
| JP | 2006-4792 A | 1/2006 |
| JP | 2006-313737 A | 11/2006 |
| JP | 2009-533833 A | 9/2009 |
| JP | 2011-198562 A | 10/2011 |
| JP | 2014-2836 A | 2/2014 |
| JP | 2014-36020 A | 2/2014 |
| JP | 2014-519166 A | 8/2014 |
| JP | 2015-002086 A | 1/2015 |
| JP | 2015-008092 A | 1/2015 |
| JP | 2015-141789 A | 8/2015 |
| JP | 2016-042433 A | 3/2016 |
| JP | 2016-519401 A | 6/2016 |
| KR | 10-0250163 B1 | 3/2000 |
| KR | 10-2006-0103028 | 9/2006 |
| KR | 10-2007-0065301 A | 6/2007 |
| KR | 10-2008-0036250 A | 4/2008 |
| KR | 10-2009-0110469 A | 10/2009 |
| KR | 10-2010-0137290 A | 12/2010 |
| WO | 02/45190 A1 | 6/2002 |
| WO | 2007/097172 A1 | 8/2007 |
| WO | 2012/133233 A1 | 10/2012 |
| WO | 2013/038946 A1 | 3/2013 |
| WO | 2016/050329 | 4/2016 |

OTHER PUBLICATIONS

Search Report dated Sep. 21, 2017, directed to GB Application No. 1704294.6; 1 page.

Notice of Reasons for Rejection dated Aug. 3, 2020, directed to JP Application No. 2019-550741; 13 pages.

Notification of Reason for Refusal dated Jan. 6, 2021, directed to KR Application No. 10-2019-7028479; 10 pages.

Notice of Reasons for Rejection dated Apr. 19, 2021, directed to JP Application No. 2019-550741; 9 pages.

International Search Report and Written Opinion received for PCT Patent Application No. PCT/GB2018/050691, dated Jun. 1, 2018, 11 pages.

International Search Report and Written Opinion received for PCT Patent Application No. PCT/GB2018/050693, dated May 30, 2018, 10 pages.

International Search Report and Written Opinion received for PCT Patent Application No. PCT/GB2018/050694, dated May 30, 2018, 9 pages.

Notice of Reasons for Rejection dated Jul. 27, 2020, directed to JP Application No. 2019-550576; 9 pages.

Notice of Reasons for Rejection dated Aug. 17, 2020, directed to JP Application No. 2019-550854; 7 pages.

Notice of Reasons for Rejection dated Sep. 7, 2020, directed to JP Application No. 2019-550842; 8 pages.

Notification of Reason for Refusal dated Jan. 6, 2021, directed to KR Application No. 10-2019-7028478; 13 pages.

Notification of Reason for Refusal dated Jan. 6, 2021, directed to KR Application No. 10-2019-7028480; 10 pages.

Notification of Reason for Refusal dated Jan. 6, 2021, directed to KR Application No. 10-2019-7028481; 12 pages.

Office Action received for Japanese Patent Application No. 2019-550842, dated Jun. 7, 2021, 6 pages (3 pages of English Translation and 3 pages of Original Document).

Office Action received for Korean Patent Application No. 10-2019-7028478, dated Jul. 8, 2021, 10 pages (5 pages of English Translation and 5 pages of Original Document).

Office Action received for Korean Patent Application No. 10-2019-7028479, dated Jul. 8, 2021, 9 pages (5 pages of English Translation and 4 pages of Original Document).

Office Action received for Korean Patent Application No. 10-2019-7028480, dated Jul. 8, 2021, 8 pages (4 pages of English Translation and 4 pages of Original Document).

Office Action received for Korean Patent Application No. 10-2019-7028481, dated Jul. 8, 2021, 10 pages (5 pages of English Translation and 5 pages of Original Document).

Search Report dated Sep. 21, 2017, directed to GB Application No. 1704292.0; 1 page.

Search Report dated Sep. 21, 2017, directed to GB Application No. 1704293.8; 1 page.

Search Report dated Sep. 21, 2017, directed to GB Application No. 1704295.3; 1 page.

Office Action received for Chinese Patent Application No. 201880018914.7, dated Mar. 14, 2022, 22 pages (13 pages of English Translation and 9 pages of Original Document).

Office Action received for Chinese Patent Application No. 201880018955.6, dated Mar. 14, 2021, 23 pages (13 pages of English Translation and 10 pages of Original Document).

Office Action received for European Application No. 18714056.1, dated Feb. 5, 2021, 5 pages.

(56) References Cited

OTHER PUBLICATIONS

Office Action received for Chinese Patent Application No. 201880018923.6, dated Mar. 14, 2022, 26 pages (16 pages of English Translation and 10 pages of Original Document).
Office Action received for Chinese Patent Application No. 201880018923.6, dated Sep. 6, 2021, 15 pages (6 pages of English Translation and 9 pages of Original Document).
Office Action received for European Application No. 18714054.6, dated Feb. 5, 2021, 6 pages.
Office Action received for Chinese Patent Application No. 201880019128.9, dated Jun. 28, 2022, 17 pages (10 pages of English Translation and 7 pages of Original Document).

\* cited by examiner

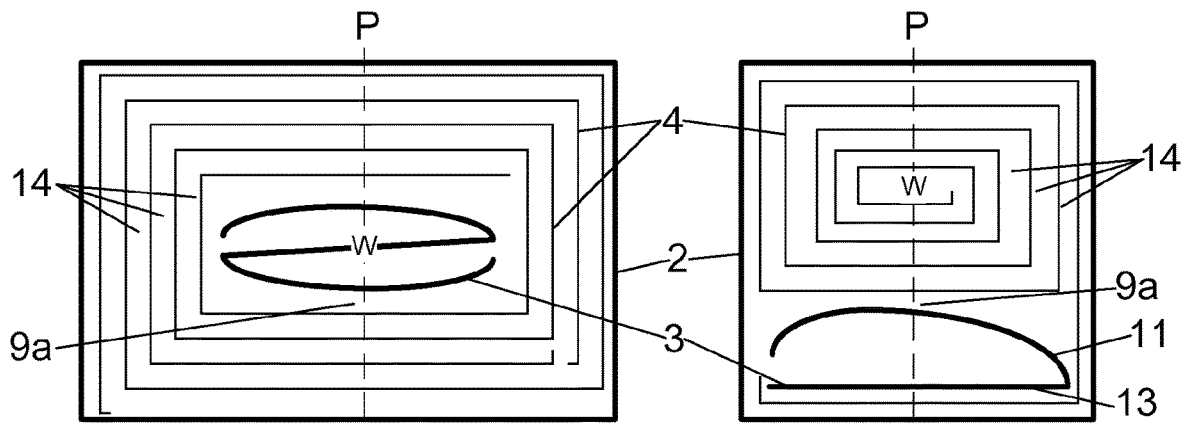
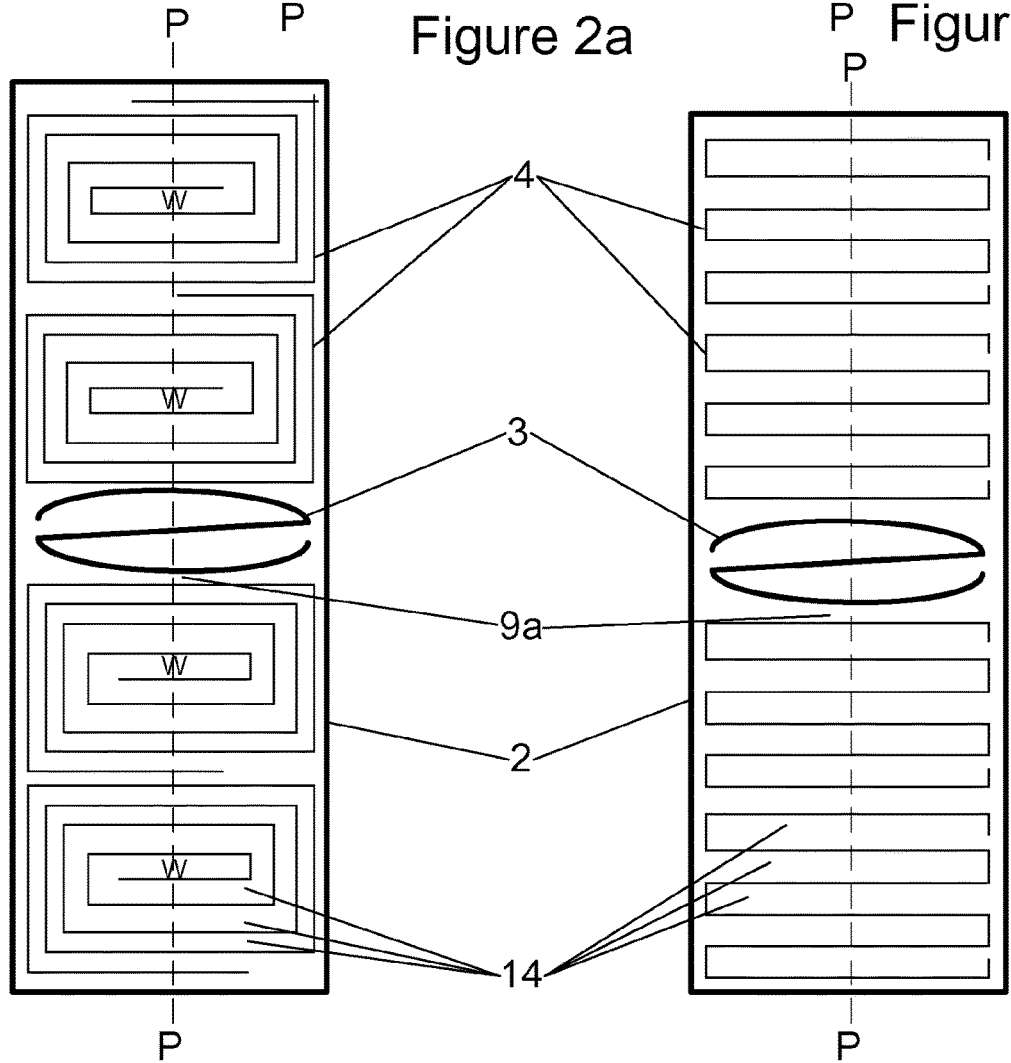
Figure 2a
Figure 2b
Figure 2c
Figure 2d

ENERGY STORAGE DEVICE

REFERENCE TO RELATED APPLICATIONS

This application is a national stage application under 35 USC 371 of International Application No. PCT/GB2018/050692, filed Mar. 16, 2018, which claims the priority of United Kingdom Application No. 1704294.6, filed Mar. 17, 2017, the entire contents of each of which are incorporated herein by reference.

FIELD OF THE INVENTION

This invention relates to a container for an energy storage device. More specifically, the present invention relates to a container for electrochemical cells.

BACKGROUND OF THE INVENTION

Electrochemical cells housed within energy storage devices comprise reactive and hazardous materials that require carefully designed packaging to ensure product safety. The packaging should be able to contain the hazardous material and also accommodate for changes in temperature and volume as the cells charge and discharge. As well as having a desired robustness, the packaging is also required to have a low weight and volumetric efficiency, so as not to diminish the overall energy density of the energy storage device. The design of the packaging should also avoid adding any unnecessary resistance to energy storage device.

SUMMARY OF THE INVENTION

In some embodiments of the present invention, there is provided an energy storage device comprising: a container, a mandrel, at least one sheet of separator material, and two or more discrete electrodes; the container comprising an internal space defined by at least one internal wall and a base; the mandrel comprising a longitudinal axis, and being positioned in the container such that the longitudinal axis passes through the internal space and the base; and the sheet of separator material is arranged about the mandrel to provide a plurality of discrete separator layers, the separator layers being spaced apart in a packing direction normal to the longitudinal axis; wherein at least one electrode is provided to occupy the space between each of the discrete separator layers, and the mandrel has at least one hollow column running along the length of the longitudinal axis such that a part of the base is accessible via the hollow column.

The design of the mandrel allows for access to the inside surface of the base of the container. The cell may comprise multiple sets of electrodes, with each electrode having a tab for connecting to either the base or a cap of the container. During manufacture, the discrete electrodes are provided in the separator material around or about the mandrel. This cell composite can then be placed into the container, and the tabs for connecting or welding to the base of the container can be accessed through the hollow columns of the mandrel.

The combination of discrete electrode sheets and a compressible mandrel allows for a cell comprising a stack of efficiently connected high energy density electrodes stored within a resilient protective container, in contrast to typical wound cells that rely on a continuous sheet of anode/cathode electrode material wound within the separator material. As such the device may comprise two or more discrete positive electrodes and two or more discrete negative electrodes.

The container may be cylindrical and the mandrel may have an elliptically shaped cross-section along the winding axis. Preferably the mandrel is made of a single material to reduce the cost of manufacture and is shaped so as to be resiliently biased in the direction of the packing axis of the container. The mandrel may take a general "S" shape, with two faces and a connecting arm. In some embodiments, the hollow columns are formed in the dead space between the faces and the connecting arm. The dead space within the energy storage device container gives rise to volume that could accommodate additional cells, and so can be seen to be a less volumetrically efficient use of space than conventional soft-pack cell and prismatic cell designs. However, the hollow columns allow for an improved manufacturing process.

The face of the mandrel may be curved. The curved face of the mandrel can provide a uniform stack pressure over the surface of the electrodes within the packaging. In addition, the mandrel surfaces can adapt their shape effectively to relieve any build-up of pressure during cell expansion. In addition, the mandrel might be compressible in a packing direction which is normal to the longitudinal axis to absorb any further increase in cell expansion. In some embodiments, a component of the electrochemical cell does not need to be wound around the mandrel, the mandrel main function is to support the separator material against the inner surfaces of the container by contracting or expanding according to the electrode volume during a charge or discharge.

The separator material may be wound around the mandrel. This allows for simplified manufacture of the energy storage device. Furthermore, the container can be shaped such that it receives the wound separator material and electrodes based on the shape of the mandrel. In other words, the general shape of the mandrel and the container are generally concentric with each other, with the separator and electrode matrix filling the cavity between the mandrel and the container internal walls.

The longitudinal axis of the mandrel may align with the centre of the base of the container. The mandrel may have more than one hollow column which would allow access to at least a part of the base of the can. Since the electrodes may each have a tab for welding onto the base of the container, having hollow columns would allow access to multiple points for welding the tabs to the base, which would avoid build-up of tabs and welding materials in one part only of the base.

BRIEF DESCRIPTION OF THE DRAWINGS

In order to better understand the present invention, and to show more clearly how embodiments of the present invention may be put into effect, embodiments will now be described, by way of example, with reference to the following drawings:

FIGS. 2a-2d are schematics of alternative layouts of separator material and mandrel within the energy storage device, according to some embodiments;

DETAILED DESCRIPTION OF THE INVENTION

Figure 1:
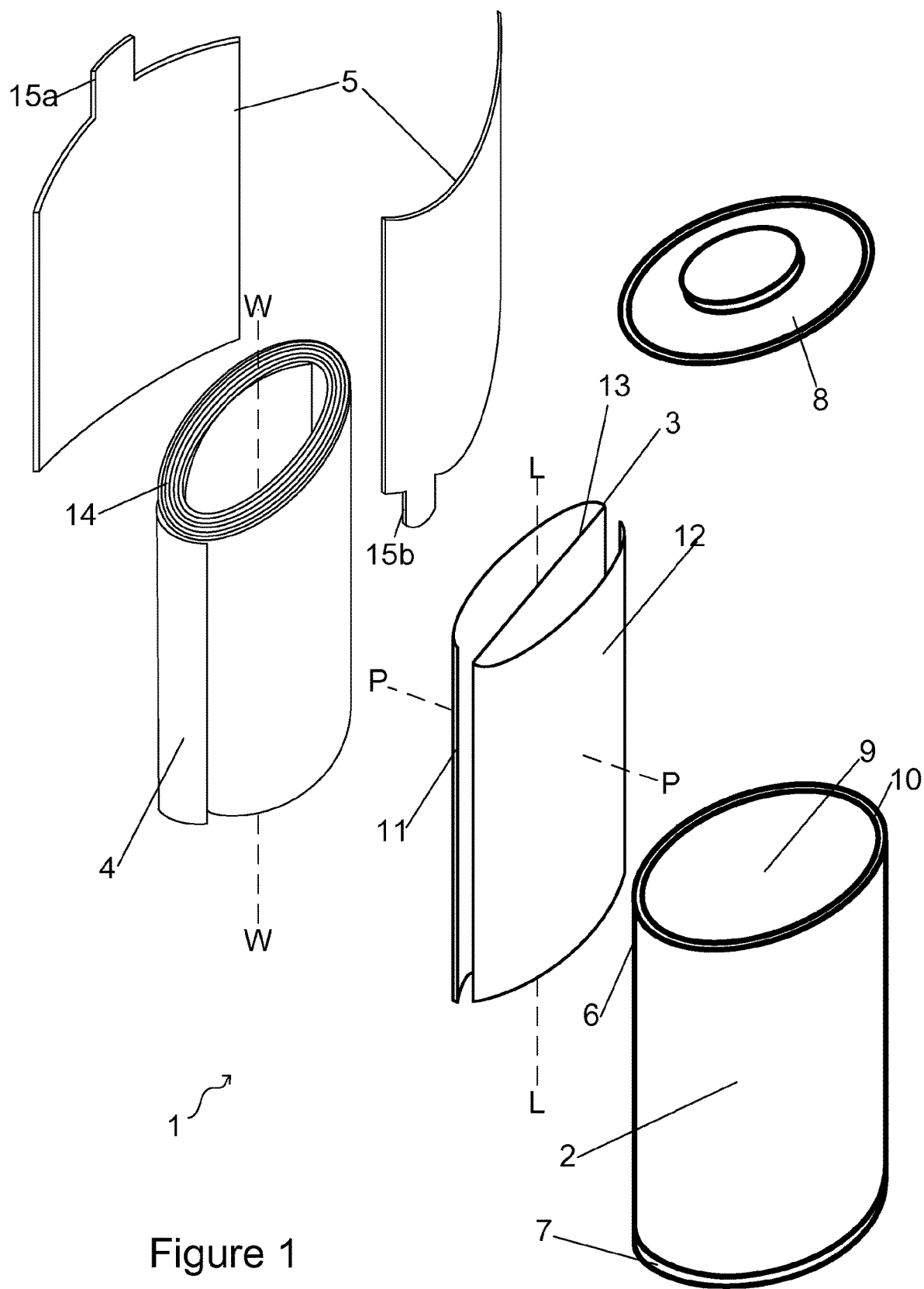
FIG. 1 is an exploded view of a schematic of an energy storage device of the present invention, according to some embodiments

FIG. 1 shows an energy storage device 1 comprising a container 2, a compressible mandrel 3, separator material 4, and discrete electrodes 5. The container 2 has a casing 6, a base 7 and a cap 8 that together form the shell of the energy storage device 1. The casing 6 is formed of robust material to avoid external objects from piercing or rupturing the device 1. The casing 6 could be deep drawn/rolled/shaped and formed with the base 7 and cap 8 so as to form an internal space 9 for holding the electrochemical cell components, namely the compressible mandrel 3, separator material 4, and electrodes 5. The casing 6 has an inner surface 10 facing into the space 9. The base 7 and cap 8 are provided over the open ends of the casing 6 to enclose the electrochemical cell components 3, 4, 5 within the container 2. Although the base 7 and cap 8 are shown as separate parts from the casing 6, it is conceivable that the casing 6 may include, or be attached to, a preformed base 7 and cap 8.

The mandrel 3 has a first mandrel surface 11 and second mandrel surface 12 connected by an arm 13. The mandrel 3 is formed from a single piece of pliable material, such as a plastic or metal. The cross section of the mandrel 3 generally has the shape of an S and its outline is elliptical. The mandrel 3 has a longitudinal axis L which is normal to the S shape formed by the curved surfaces 11, 12 and the arm 13. The mandrel 3 extends along its longitudinal axis L such that it is similar in length to the container 2. The general cross-sectional shape of the mandrel 3 is the same along the entire length of its longitudinal axis L.

The mandrel 3 is formed so that it can be placed in the internal space 9 of the container 2. When the mandrel 3 is positioned within the internal space 9, a cavity 9a remains between the mandrel surfaces 11, 12 and the inner surface 10 of the container 2. Due to the shape of the mandrel 3, columns of hollow dead space exist between the mandrel surfaces 11, 12 and the arm 13 which extend along the longitudinal axis L. The hollow columns allow space for the mandrel 3 to collapse, as well as providing access for welding to at least part of the base 7 when the electrochemical cell components 3, 4, 5 are placed within the container 2.

The mandrel 3 is compressible in the direction of a packing axis P, which will be described in more detail in relation to the separator material 4. Generally speaking, the mandrel 3 can compress and/or deform such that the general elliptical shaped outline of its cross section decreases in size. The volume of the space 9 taken up by the mandrel 3 decreases as the mandrel 3 compresses. Furthermore, the mandrel surfaces 11, 12 can deform under extreme pressure such that the curvature or arc can change according to compression forces applied to the surface.

The separator material 4 as presented in FIG. 1 is a continuous sheet of electronically insulating porous material. The separator material 4 is rolled and positioned within the cavity 9a between the container 2 and the mandrel 3. The separator material 4 is wound around the mandrel 3 about a winding axis W which overlies the longitudinal axis L of the mandrel 3 when the electrochemical cell container 1 is in its complete form. As the sheet of separator material 4 is wound about winding axis W, layers of separator material are formed as the sheet rolls over itself. In the complete energy storage device 1, the separator material 4 is arranged in the container 2 to provide a plurality of separator layers placed along the packing axis P. This creates spaces 14 between layers of the separator material 4.

Electrodes 5 are positioned along the packing axis P within the spaces 14 of the wound separator material 4. For simplicity, only two electrodes 5 (one anode and one cathode along with the separator material 4 forming a cell) are shown in FIG. 1. However, an electrochemical cell container 1 of embodiments of the present invention may contain many electrodes 5, forming multiple electrochemical cells.

The electrodes 5 each comprise a tab 15a, 15b which can be secured to the internal surfaces of the base 7 and cap 8. By providing a tabs 15a, 15b on each electrode 5, the current path length for each electrode 5 is reduced and the internal resistance of the cell decreases.

As the cells charge/discharge, the electrodes 5 may expand and contract. As the electrodes 5 expand and occupy more volume within the internal space 9, the mandrel 3 compresses. Similarly, as the electrodes contract, the mandrel 3 expands to re-occupy the volume whilst also providing a constant compressive force along the packing axis P between the separator material 4 and the electrodes 5. The curved mandrel surfaces 11, 12 ensure that a uniform pressure over the surface of the electrodes 5 is maintained.

Various alternative electrochemical cell container 1 arrangements that are within the scope of the present invention are shown schematically in FIGS. 2a-2d. The electrochemical cell containers 1 are shown in cross section along the longitudinal axis L of the mandrel 3, and without electrodes 5 for simplicity. Each electrochemical cell container 1 is shown in an over simplified manner as a squared container 2. However, it is appreciated that the separator material 4 would curve to occupy the internal space 9 of the container 2.

In FIG. 2a, two sheets of separator material 4 are wound about the mandrel 3. The mandrel 3 is positioned along the winding axis W of the separator materials 4. The sheets of the separator material 4 are concentric about the longitudinal axis L of the mandrel 3. A multitude of layers 14 is provided between the layers of the wound separator material 4 for housing electrodes 5. The electrodes 5 are arranged along the packing axis P.

In FIG. 2b, a mandrel 3 is provided with a single curved surface 11. The mandrel arm 13 rests against an internal surface 10 of the container 2. One sheet of separator material 4 is provided in the internal space 9 and is wound around a winding axis W. The winding axis W does not overlie the longitudinal axis L of the mandrel 3. Discrete layers 14 are provided in the roll of separator material 4 for housing electrodes. The electrodes 5 are arranged along the packing axis P.

FIGS. 2c and 2d illustrate further embodiments of the present invention, where rolls or folds of separator material sheets 4 are positioned in the cavities 9a about the mandrel 3, the separator 4 is not wound about the mandrel 3. The device in FIG. 2c comprises two rolled sheets of separator material 4 in each cavity 9a. In FIG. 2d, the sheets of separator material 4 are folded in the cavity 9a. Electrodes 5 would be placed within the spiral or folds of the separator material 4. In these cases, the mandrel 3 is merely functioning to absorb expansion of the electrode 5 within the device 1, and not providing a bobbin for material 4, 5 to be wound around.

Figure 3A:
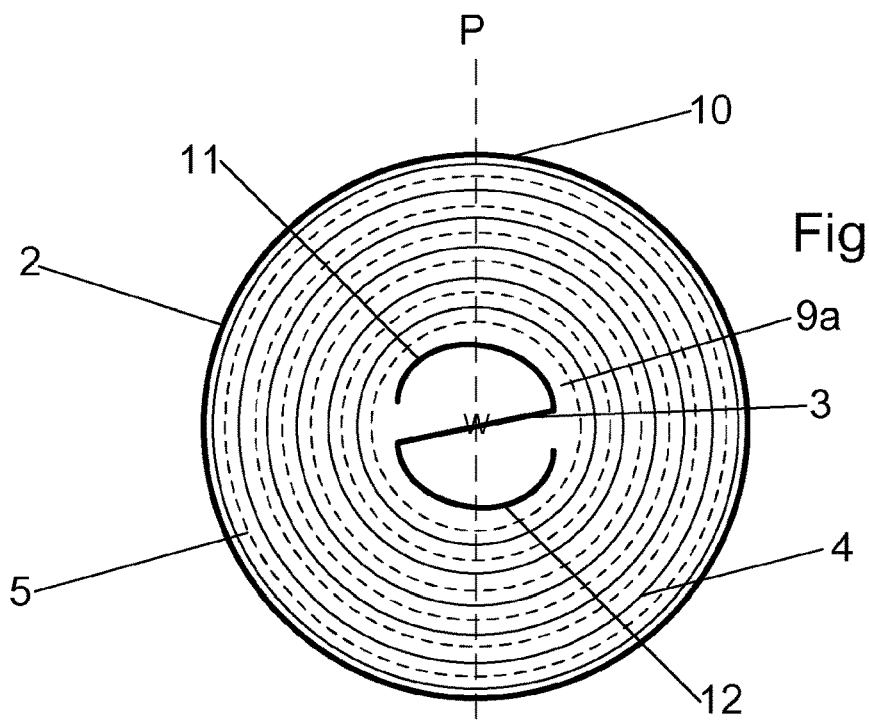
FIGS. 3a-3c are schematics of energy storage devices of the present invention, according to some embodiments.
Figure 3B:
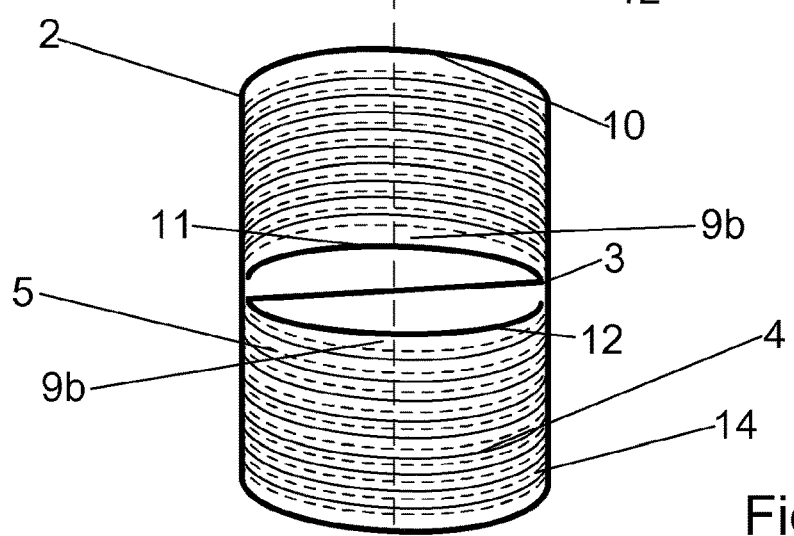
Figure 3C:
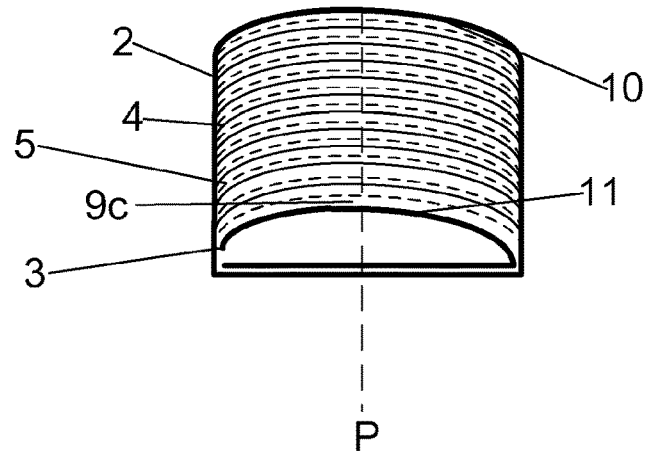

The container 2 in FIG. 1 is shown as cylindrical but could also form the shape of any prismatic cell. Cross-sectional schematics are shown in FIGS. 3a-3c of device 1. The layers of separator material 4 are shown as concentric rings instead of a continuous rolled sheet in the cavity 9a merely as a way of simplifying the drawing. Electrodes 5 are shown schematically as broken lines and are positioned within the layers 14 between the rolled sheets of separator material 4. FIG. 3a shows a simplified cross sectional view of the complete device 1 of FIG. 1. The inner surface 10 is one continuous surface, and the mandrel surfaces 11, 12 face different regions of the same inner surface 10.

FIG. 3b illustrates a device 1 that has a generally cuboid shaped container 2, wherein the inner surfaces 10 facing the mandrel faces 11, 12 are concave. The separator material 4 is folded or wound so that fills the cavities 9b between the mandrel surfaces 11, 12 and the inner surface 10 of the container 2. The separator material 4 is arranged to provide layers 14 along the packing axis P, the layers being filled with electrodes 5. The curvature of the concave inner surface 10 similar to the curvature of the mandrel surfaces 11, 12 such that a uniform pressure is applied across the surface of the electrodes 5 within the layers 14 of separator material 4.

FIG. 3c illustrates a device 1 that has a generally cuboid shaped container 2, wherein the device 1 has only one cavity 9c which is filled with electrochemical cells. The inner surface 10 facing the mandrel face 11 is concave. The separator material 4 is folded or wound so that fills the cavity 9c between the mandrel surfaces 11, 12 and the inner surface 10 of the container 2. The separator material 4 is arranged to provide layers 14 along the packing axis P, the layers being filled with electrodes 5. The curvature of the concave inner surface 10 similar to the curvature of the mandrel surfaces 11, 12 such that a uniform pressure is applied across the surface of the electrodes 5 within the layers 14 of separator material 4.

In the examples shown in FIGS. 3a-3c, the curvature of the external casing matches the concave shape of the inner surfaces 10, the external casing may be flatted to provide an external cuboid shape. However, it may be beneficial to keep the curvature of the casing 6.

Figure 4A:
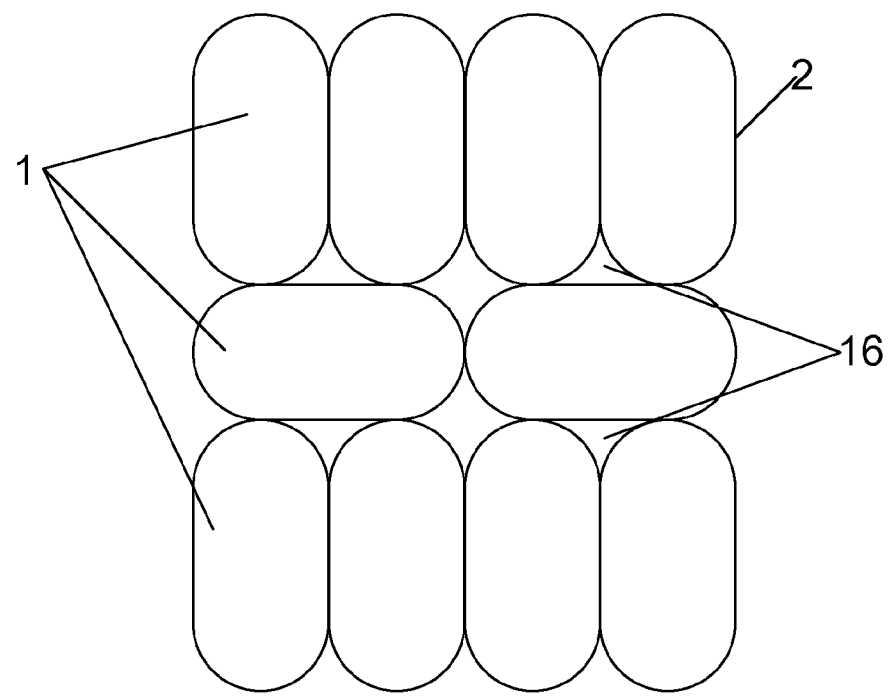
FIGS. 4a and 4b are schematics of arrays of alternative container shapes, according to some embodiments.
Figure 4B:
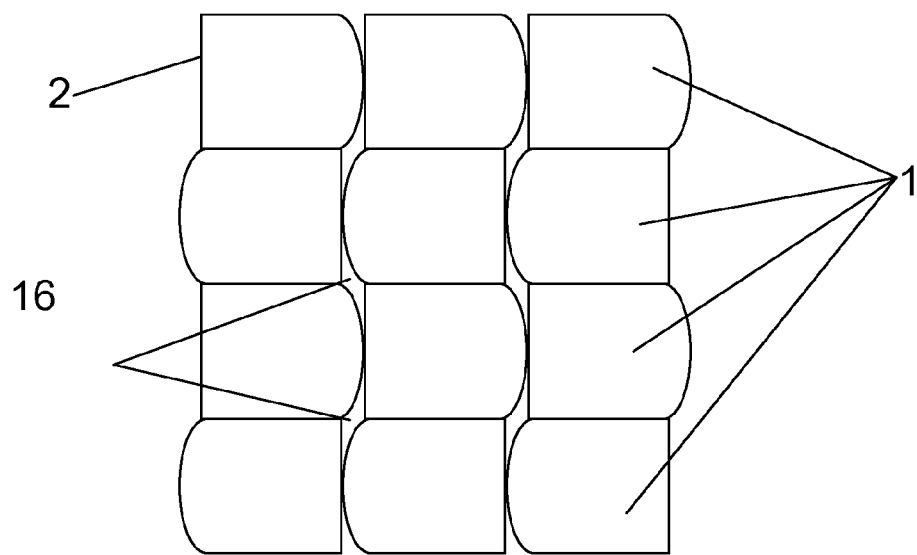

FIGS. 4a and 4b show an array of energy storage devices 1 according to FIGS. 3b and 3c respectively. The curvature of the casing 6 allows for gaps 16 between the containers 2 when arranged in an array. The curved casing 6 ensures that physical contact between adjacent containers 2 is reduced. A fluid such as air can be provided in the gaps 16 between the containers 2. The reduced contact between the containers 2 ensures that low heat transfer occurs between adjacent devices 1. In addition, fluid is free to flow over the array of containers and act as a coolant to remove any excess heat given off by the cells within the devices 1.

The invention claimed is:

1. An energy storage device comprising:
a container comprising an internal space defined by at least one internal wall and a base;
a mandrel comprising a longitudinal axis and positioned in the container such that the longitudinal axis passes through the internal space and the base;
a plurality of sheets of separator material arranged about the mandrel to provide a plurality of discrete separator layers, the separator layers being spaced substantially equally apart from adjacent separator layers at least in a packing direction normal to the longitudinal axis; and
a plurality of discrete electrodes distributedly disposed at least along the packing direction;
wherein the plurality of discrete electrodes comprises a plurality of discrete positive electrodes and a plurality of discrete negative electrodes,
wherein the plurality of discrete electrodes occupies space between adjacent discrete separator layers of the plurality of discrete separator layers,
wherein the mandrel comprises at least one hollow column running along a length of the longitudinal axis such that a portion of the base is accessible via the hollow column,
wherein the plurality of sheets of separator material is wound concentrically around the mandrel.

2. The device of claim 1, wherein the container is cylindrical and the mandrel has an elliptically shaped cross-section along a longitudinal axis.

3. The device of claim 1, wherein at least one discrete electrode of the plurality of discrete electrodes comprises a tab configured to be welded onto the base of the container.

4. The device of claim 1, wherein the longitudinal axis of the mandrel aligns with a center of the base of the container.

5. The device of claim 1, wherein the mandrel is compressible in the packing direction.

* * * * *